United States Patent [19]

Dunegan

[11] 4,400,123
[45] Aug. 23, 1983

[54] NUT AND THREAD PROTECTOR

[75] Inventor: Ronald G. Dunegan, Katy, Tex.

[73] Assignee: Rodun Development Corporation, Houston, Tex.

[21] Appl. No.: 168,504

[22] Filed: Jul. 14, 1980

[51] Int. Cl.³ ............................................ F16B 37/14
[52] U.S. Cl. ................... 411/373; 116/270; 184/1 R; 184/1 C; 184/103 R
[58] Field of Search ............... 411/373, 371, 428, 429, 411/427; 184/1 R, 1 C, 103 R, 65, 1 E; 138/96 T, DIG. 6; 10/86 C; 116/270, 266, 264; 277/17

[56] References Cited

U.S. PATENT DOCUMENTS

| 1,254,514 | 1/1918 | Lehmann | 411/429 |
| 1,450,583 | 3/1923 | Ferry | 411/429 |
| 1,630,584 | 5/1927 | Schneider | 411/371 X |
| 2,456,234 | 12/1948 | Young | 411/428 X |
| 2,924,876 | 2/1960 | Lewis | 184/1 R X |
| 3,703,879 | 11/1972 | Huthsing, Jr. | 116/270 |
| 3,983,958 | 10/1976 | Swearingen | 184/103 R |
| 4,114,702 | 9/1978 | Maurer et al. | 184/1 C X |

FOREIGN PATENT DOCUMENTS

| 1812548 | 1/1977 | Fed. Rep. of Germany | 116/270 |
| 1134996 | 12/1956 | France | 184/1 R |

Primary Examiner—Ramon S. Britts
Attorney, Agent, or Firm—Carwell & Helmreich

[57] ABSTRACT

Methods and apparatus are provided for protecting nuts and protruding threads of bolts from corrosion and damage. A cup-shaped cap is provided for sealingly enclosing the exposed threads. A suitable protecting fluid may be introduced through a charging port, and an expandable bladder protruding from the side of the cap indicates that the cap is maintaining the protective fluid under pressure. A nut cover is slidably mounted to the cap, and serves to protect the nut from the environment.

19 Claims, 7 Drawing Figures

NUT AND THREAD PROTECTOR

BACKGROUND OF THE INVENTION

This invention relates to methods and apparatus for protecting nuts and protruding threads of bolts, and is particularly suitable for protecting nuts and threads in equipment exposed to corrosive environments.

Most mechanical equipment is assembled with nuts and bolts, which enables the equipment to be disassembled for maintenance and repair. The exposed threads of machines located within manufacturing plants generally do not corrode rapidly, and therefore maintenance personnel can easily unthread the required nuts in order to disassemble the machines. In equipment located outdoors or equipment exposed to highly corrosive environments, however, the exposed threads often corrode to the extent that the nuts cannot be removed or can only be removed with extreme difficulty.

In the petroleum industry, for instance, large quantities of equipment, such as valves and flanges, are located outdoors or are otherwise susceptible to highly corrosive environments. Such equipment may require disassembly only after years of service, by which time the exposed threads of bolts are so corroded that the nuts cannot be removed. Countless man hours have been spent trying to remove nuts from such equipment. Often the nuts can be broken free and unthreaded a short distance, but the exposed threads are so damaged or corroded that the nut cannot be further removed. In many cases, the removal operation severely damages the nut or bolt; in other instances, hydraulically powered hacksaws are used to cut through the bolt and nut so that the equipment can be disassembled. Corrosion of the exposed threads in this equipment results in a tremendous loss of time and material, and is a continual problem for maintenance personnel.

Many attempts have been made to alleviate this problem. Nuts and protruding threads have been coated with various lubricants in an attempt to inhibit corrosion. One problem is that these lubricants generally tend to wear away and do not remain on the threads for a sufficient length of time. Thus, the threads must be recoated on a regular basis, which is costly and time consuming.

Other coatings have been tried, such as lead coatings and special paints, but these coatings are expensive and often do not result in sufficient corrosion inhibition for the entire area of the thread. If someone or something comes into contact with these coatings, some of the coating may rub off, so that a portion of the thread is exposed and therefore corrodes. Unfortunately, corrosion of one portion of the thread is almost as deleterious as corrosion of the entire exposed thread, since corrosion even at one portion my result in the inability to unthread the nut from the stud or bolt.

Other persons have attempted to solve the problem with special cap nuts. Cap nuts such as are shown in U.S. Pat. Nos. 1,727,590 and 2,095,289 are not practical in many applications because of their high cost and variations in the length of the exposed bolt after the nut has been properly tightened.

Various types of cup-shaped thread protectors have been invented. The thread protectors illustrated in U.S. Pat. Nos. 972,140; 1,254,514; 1,630,584; 2,456,234; 2,551,834; 2,726,009; and 3,135,558 offer some protection to the exposed threads from the environment, but do not adequately inhibit corrosion at the thread. Corrosion of the threads may be reduced by merely sliding a cap over the threads, but moisture and corrosive elements will continue to attack the threads.

Some of the devices illustrated in the above patents utilize a protective cap and additionally attempt to seal the exposed threads from the environment. Such devices, however, have not proven to be commercially acceptable in many applications. In some instances, the more elaborate devices are not economically justified. Also, many of these devices are difficult or time consuming to install, and this is particularly true for those devices which attempt to seal the otherwise exposed threads from the environment.

Some of these patents disclose utilizing a lubricant such as grease in the interior of the cap to inhibit corrosion. Since it is frequently difficult, if not impossible, to introduce the protective lubricant into the interior of the cap after the cap has been installed, these devices have inherent disadvantages. A protective fluid having a high viscosity, e.g. grease, has been used in order to enhance retention of the fluid within the cap while the cap is installed. However, if the cap is to be mounted on a stud protruding vertically upward, even a high viscosity fluid may not be retained within the cap while the cap is being installed. Additional problems are encounted because the lubricant is physically handled by the cap installer. If one inserts too much lubricant within the cap, the protective cap may not thereafter be fully and properly positioned on the stud. An insufficient amount of lubricant, however, may not adequately protect the threads from corrosion.

Even after the cap with some protective lubricant has been installed, the prior art devices do not provide continued satisfactory protection for the threads. For example, it is difficult, if not impossible, for someone to subsequently determine whether lubricant was inserted before the cup-type thread protector was installed. Also, one cannot easily ascertain whether the lubricant has leaked from the thread protector. If lubricant below the thread protector suggests that lubricant may have leaked from the thread protector, the thread protector must be removed and reinstalled in order to bring additional lubricant into contact with the threads. Outdoor temperature variations may cause a pressure increase within the prior art caps, and pressure may increase within the cap to the extent that the cap is forced off the threads. Finally, the devices illustrated in the above patents do not satisfactorily protect the threads from corrosion, since the mere presence of a lubricant within the cup-shaped thread protector will not adequately inhibit corrosion of the threads.

An additional problem exists for protecting the nut. The threads in contact with the nut generally do not easily corrode since they are protected from the environment by the nut. The outer portion of the nut, however, is subject to corrosion. Corrosion may not structurally weaken the nut, but may inhibit the use of a proper sized wrench to remove the nut. Also, petroleum equipment such as valves and flanges are frequently painted in an attempt to inhibit corrosion of the equipment. The continued build-up of paint on the nut may likewise inhibit the use of a proper-sized wrench when the nut is to be removed.

If the proper-sized wrench is to be utilized, it may first be necessary to grind or chip away at the corrosion or paint build-up. If the corrosion or paint build-up on the nut is severe, maintenance personnel may opt for attempting to remove the nut with an oversized wrench. This procedure may, of course, damage the nut so that it can no longer be removed. Even worse, personnel using an improper wrench risk injury because of unsafe practices.

Some of the protectors in the above-cited patents also cover the nut. For instance, U.S. Pat. Nos. 2,456,234 and 2,726,009 disclose protectors which cover both the threads and the nut.

These nut protectors may function satisfactorily as a paint shield to cover the nut, and may even provide sufficient corrosion protection for the external surface of the nut. The problem, however, is that the nut protectors in the prior art patents are expensive to produce. Additionally, the prior art nut protectors are difficult or time consuming to properly install over the nut.

The problems and disadvantages of the prior art techniques, coating materials, and thread and nut protectors are such that these methods, materials and devices are not widely accepted in many applications. In the petroleum industry, for instance, nuts and exposed threads on equipment located outdoors are frequently not protected from the corrosive environment. If the equipment is especially susceptible to corrosion, the nuts and bolts may be fabricated from special metals. For instance, petroleum equipment handling high sulfur crude oil may corrode at an accelerated rate due to the presence of sulfur. The bolts and nuts of such equipment may be fabricated from stainless steel or a chrome alloy. Generally, this technique will adequately inhibit corrosion of the exposed threads and nuts, but the cost of the special-material nuts and bolts severely limits the use of this technique.

These problems and disadvantages of the prior art are overcome with the present invention. Novel methods and apparatus are hereinafter provided for protecting nuts and protruding threads of bolts or studs.

SUMMARY OF THE INVENTION

This invention is suitable for protecting a nut and exposed threads of the bolt from the environment. The invention is particularly suitable for protecting nuts and threads of equipment exposed to corrosive environments, so that the nut may thereafter be easily unthreaded.

In an exemplary embodiment of this invention, the opening of a cup-shaped plastic body is slid over the exposed threads and into engagement with the face of the nut, so that the body encloses the protruding threads. An O-ring seal is provided between the lip of the cup-shaped body and the face of the nut, so that the cavity within the body surrounding the threads is sealed from the environment.

An aperture is provided in the end of the body opposite the opening, and a leaf spring containing a stopper is mounted within the body for sealing engagement with the aperture. The leaf spring is biased so that the stopper normally seals the aperture. The stopper, however, can be forced away from the aperture, thus allowing a fluid to be inserted into the body through the aperture. Normally, however, the stopper seals the aperture, and the cavity within the body is sealed from the environment external to the body.

Another aperture is provided in the side of the body, and an expandable bladder is positioned over the aperture. As pressure increases within the cavity about the threads, the bladder expands radially outward beyond the wall of the cup-shaped body. The bladder thereby provides a visual indication of the pressure within the cavity. As subsequently explained, pressure may increase within the cavity after the body has been installed over the threads. The bladder may also serve as a pressure balancer to maintain the cavity pressure within a satisfactory range.

Externally mounted to the side of the cup near the lip is a larger cup-shaped nut cover with a hole in the base to accommodate the body enclosing the threads. The sides of the nut cover conform generally to the hexagonal configuration of the nut. When placed on a nut, the lip of the nut cover engages the sides of the nut near the base, so that the nut cover protects the exposed surfaces of the nut.

In operation, the thread protecting body and nut cover are slid over the threads and nut, respectively. The interior wall of the thread protecting body near the cup is designed for engagement with the exposed threads of the bolt or stud, so that the thread protecting body and the nut cover are secured in place by the frictional engagement of the body and the threads. As the thread protecting body is slid into position, an O-ring between the lip of the body and the face of the nut is compressed, so that the cavity within the body is sealed from the environment.

Once in place, a suitable fluid mixture, such as lubricating oil and nitrogen gas, is forced into the cavity of the body through the end aperture. When the cavity has been sufficiently pressurized, the bladder will begin to protrude beyond the side of the body. At this point, fluid injection may be terminated and the stopper returned for sealing the aperture by the biasing of the leaf spring.

The threads are thereby sealed from the environment external to the body, and the injected fluid mixture acts to substantially reduce any corrosion that might otherwise occur. Thereafter, one can intermittently check the bladder and visually determine whether the cavity remains sealed under pressure. If fluid has leaked out, the cavity can be recharged with fluid through the aperture in the manner indicated above.

The nut cover provides some protection for the exposed surfaces of the nut from the environment. In addition, the nut cover protects the nut as equipment is painted, so that the cover may be later removed and a wrench properly fitted over the nut.

Another embodiment of the present invention is similar to the one described, except that a leaf spring and stopper are not utilized. Rather, the cavity within the body has a pressure filled capsule containing a desired fluid mixture. Once the body is in place, the capsule is ruptured so that the cavity is filled with fluid under pressure. This latter embodiment would not be "rechargeable" without removing the body from the thread and the nut.

Accordingly, it is a feature of the present invention to provide improved methods and apparatus for protecting exposed threads from the environment.

It is a further feature of this invention to provide improved apparatus for protecting the exposed surfaces of a nut from the environment.

It is another feature of this invention to provide an economical thread protector which may be easily placed on the exposed threads of a stud.

Another feature of this invention is to provide a thread protector for sealingly enclosing exposed threads of a device.

It is an additional feature of this invention to provide apparatus for enclosing the exposed threads of a device, and means for pressurizing the cavity formed by such device with a selected fluid.

It is a further feature of this invention to provide a method for protecting exposed threads from the environment by enclosing the threads in a body and pressurizing the cavity within the body with a selected fluid.

These and other features and advantages of this invention will become apparent in the following detailed description, where reference is made to the figures in the accompanying drawings.

DRAWINGS

DETAILED DESCRIPTION

Figure 1:
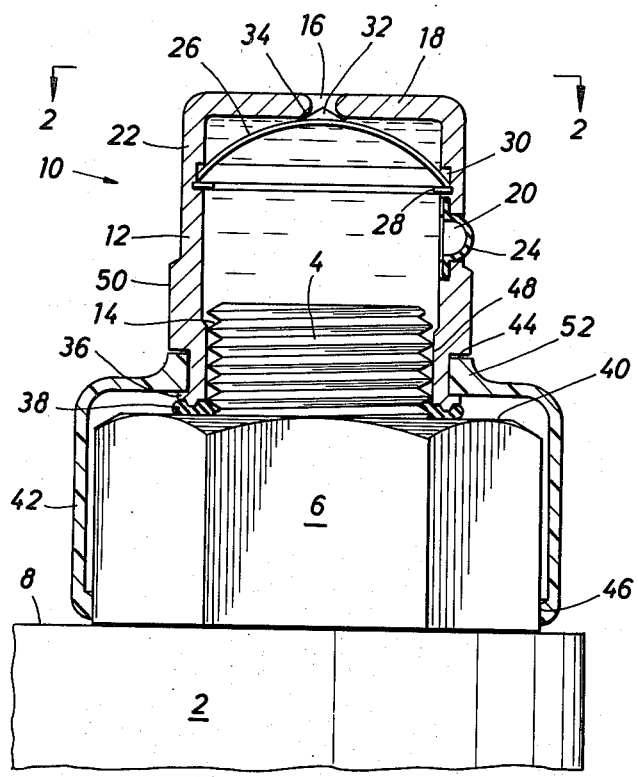
FIG. 1 is a simplified cross-sectional representation of one embodiment according to the present invention.

FIG. 1 is a simplified cross-sectional representation of one embodiment according to the present invention. A typical machine, valve, flange, or other assembly is shown generally at 2. A bolt, stud, or other threaded member 4 extends through a portion of assembly 2, and nut 6 is shown to be threaded on bolt 4 and into engagement with the surface 8 of assembly 2. The simplified representation of the assembly 2, bolt 4, and nut 6 are typical of many assemblies in which bolts and nuts are utilized, such as the assembly represented in U.S. Pat. No. 2,456,234.

A typical thread protector 10 according to the present invention is shown generally in FIG. 1. A cup-shaped body 12 is shown in engagement with exposed threads 14 of bolt 4. The body 12 is shown to contain an aperture 16 in the base 18 of the body. A second aperture 20 is shown in the wall 22, and membrane 24 is positioned over the aperture 20. A flexible leaf spring 26 is positioned in the interior of the body, and is held in place by a flexible C-ring 28 positioned in recess 30 in the interior wall of the body. Positioned on the C-ring 28 is stopper 32, which is designed to seal with aperture surface 34.

A pliable flexible member such as O-ring 38 is positioned between the lip 36 and the surface 40 of the nut 6. A hexagonal-shaped nut cover 42 is snap-fitted on an annular outer recess 44 of the body 12. An inwardly directed annular lip 46 contacts the exposed surfaces of the nut 6 at a location adjacent the assembly 2.

Figure 2:
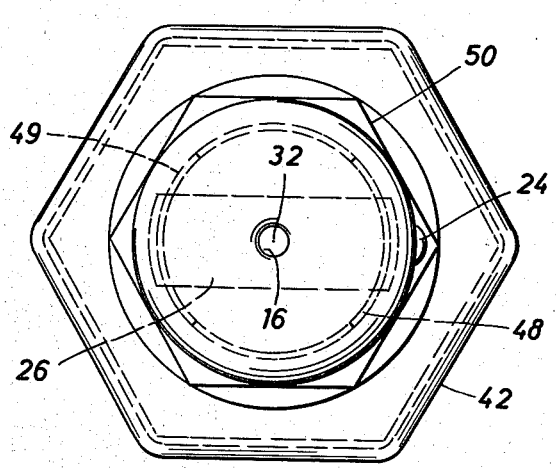
FIG. 2 is an end view of the apparatus depicted in FIG. 1.

Referring now to FIGS. 1 and 2, it may be seen that the cup-shaped body 12 and the nut cover 42 may be slid over the exposed bolt 4 and nut cover, in a direction generally aligned with the axis of the bolt 4. An interior portion 48 of the body 12 is designed for engagement with the threads 14, such that the exposed threads 14 serve to hold the body 12 and nut cover 42 in place over the threads and nut, respectively. The body 12 may be pressed over the threads 14, thus compressing the O-ring 38 against the surface 40 of the nut. If desired, a hexagonal gripping portion 50 may be formed on the wall 22, so that the body 12 may be axially rotated after being pressed on the threads 14, to insure that sufficient compressional force has been applied to the O-ring 38. The nut cover 42 is slidably positioned with respect to the body 12, and it may be seen that if the body 12 is rotated, the hexagonal nut cover 42 may experience slight axial movement, but would not rotate along with the body 12.

In FIG. 2, the leaf spring 26 is shown to be generally rectangular in configuration. If the stopper 32 were moved out of engagement with the aperture surface 34, and fluid were inserted through the aperture 16, it may be seen that the fluid may enter the interior of the body.

The membrane 24 is sealingly fitted over the aperture 20, and may be retained in position by any suitable means, such as gluing the membrane 24 to the interior of the wall 22. If desired, the interior of the wall 22 may be recessed in the area of the membrane 24, so that no part of the membrane 24 is positioned inwardly of the interior surface of the wall 22. If the membrane 24 is recessed, or alternatively if the interior portion 48 is formed inwardly of the remaining interior portions of the wall 22, it may be seen that one thread protector 10 may be employed for a variety of bolts 4 having the same diameter but having varying lengths of thread extending from the nut 6. The membrane 24 is flexible and responsive to pressure variations, as explained further below, so that a portion of the membrane 24 may extend outwardly of the wall 22 when subjected to sufficient internal pressure.

The length of the nut cover 42 is regulated so that the tip 46 does not generally come into engagement with the surface 8 of the assembly 2. Thus, the nut cover 42 covers substantially all of the exposed surface area of the nut 6, but the tip 46 does not engage the assembly 2, so that the nut cover 42 does not restrain axial movement of the body 22 with respect to the nut 6.

The operation of the embodiment depicted in FIGS. 1 and 2 will now be briefly described. The thread protector 10, including the nut cover 42, is slid over the exposed threads 14 and nut 6, respectively. The O-ring 38 is thereby compressed between the lip 36 of the cup-shaped body and the surface 8 of the nut 6. Also, the O-ring 38 sealingly engages a portion of the threads 14, so that fluid cannot pass between the lip 38 of body 12 and the nut, and cannot pass into the interior of the nut 6 along the threads 14. When in place, the thread protector 10 therefor completely encloses the exposed threads 14 and seals the threads from the environment. If desired, the body 12 may be rotated slightly with respect to the threads 14, so that sufficient compressional force may be exerted on the O-ring 38. The nut cover 42 substantially encloses the exposed surfaces of the nut 6, although the tip 46 of the nut cover is not designed for engagement with the assembly 2. If the thread protector 10 is rotated on the threads 14, it will be seen that the nut cover 42 would not likewise rotate, but rather would slide within the recess 44 with respect to the thread protector 10.

When the thread protector 10 is properly positioned over the exposed threads, a suitable fluid may be inserted into the interior of the body 12 through the aperture 16. For instance, a pressurized cylinder having a pointed spray nozzle (not depicted) may be used for inserting fluid into the interior of the thread protector 10. The pointed spray nozzle may be used to force the stopper 32 away from the aperture surface 34, and a valve on the pressurized cylinder may be activated to allow a mixture of lubricating oil and nitrogen gas to enter the interior of the body 12 through the spray nozzle. The pressure within the body 12 will increase in response to the pressurized mixture of lubricating oil and nitrogen gas. This increase in pressure will cause the membrane 24 to protrude from the wall 22, so that an operator can visually detect the increase of pressure within the body 12. When the interior of the body 12 has been pressurized to a predetermined pressure range, fluid injection may be terminated and the spray nozzle retracted, thus causing the leaf spring 26 to bring the stopper 32 into sealing engagement with the aperture surface 34. It will thus be seen that the selected fluid mixture has filled the interior of the body 12, but has not been allowed to enter the interior of the nut cover 42.

The thread protector 10 not only seals the exposed threads 14 from the environment, but serves to retain a selected fluid under pressure to retard any corrosion of the threads 14. It is believed that a suitable fluid for injecting into the thread protector is a petroleum base lubricant combined with an inert gas propellant. Although a liquid mixture alone may be used to fill the interior of the body 12, the combination of a liquid and gas is desirable since the compressed gas may be used to propel the liquid into the interior of the body.

As previously described, the membrane 24 serves as a visual indication that fluid is retained within the body 12 at a predetermined pressure range. Thus, the material composition and thickness of the membrane 24 may be varied so that the membrane protrudes a selected distance from the wall 22 when the pressure is within the predetermined acceptable range.

In addition, the membrane 24 can expand or contract, so that a desired pressure range is maintained within the interior of the body in spite of atmospheric temperature and pressure variations. The membrane 24 therefore functions as both a pressure indicator and a pressure stabilizer. The thread protector may be installed when the ambient temperature is 50° F., and a fluid mixture inserted into the interior of the body 12 until the membrane 24 protrudes from the side of the body 12. If the ambient temperature thereafter rises to 100° F., the pressure within the body 12 may also increase, so that the membrane 24 further expands to maintain the pressure level within an acceptable range. If the membrane 24 did not provide this pressure stablization feature, the pressure in the interior of the body may increase to the extent that the body is pushed or forced off the threads 14. In order to accommodate temperature and pressure variations, it is desirable to pressurize the interior of the body 12 from at least ½ to 5 PSIG, and preferably within a range of from 1 to 3 PSIG. With the interior of the body 12 so pressurized, the atmospheric temperature and pressure variations during a day and during various seasons will not produce a sizable pressure increase within the interior of the body 12. The area of the membrane 24 may also be increased or decreased to allow for the necessary volume changes to maintain the desired pressure range in the interior of the body 12. The membrane 24 therefore acts as a relief balancer, so that the pressure in the interior body does not increase beyond a desirable range.

In the embodiment illustrated in FIG. 1, the O-ring 38 serves to seal the lip 36 of the body against the surface 40 of the nut, and also serves to seal the threads 14 so that the fluid mixture will not travel in a spiral fashion through the interior of the nut 6. If desired, the size and shape of the O-ring may be changed so that a seal is not provided along the threads 14, and fluid may therefore penetrate into the interior of the nut 6 along the threads 14. A disadvantage of this latter embodiment is that it may be possible for fluid to leak adjacent to surface 8 or into the interior of the assembly 2, and thus the desired fluid pressure may not be maintained within the body 12.

The injected fluid should remain within the interior of the body 12 under pressure for a long period of time. It is possible, of course, that fluid may slowly leak from the body, and therefore the pressure within the interior of the body would be reduced. If this occurs, the membrane 24 would retract slightly, so that the membrane no longer protrudes from the wall 22. At various times, an operator may check the thread protector 10, and can therefore visually detect whether there is sufficient pressure remaining within the interior of the body. Even though fluid has leaked from the interior of the body, the presence of the penetrating oil in contact with the threads 14 will substantially reduce corrosion of the threads 14, especially since the thread protector 10 continues to physically cover the exposed threads 14. If the membrane 24 has receded, an operator may recharge or repressurize the interior of the body 12 in the manner previously described, until the membrane 24 again protrudes beyond the wall 22.

The hexagonal-shaped nut cover 42 is slidably carried by the body 12. Prior to sliding the body 12 over the threads 14, the base portion 52 of the nut cover 42 may be snap-fitted into the annular recess 44. Alternatively, the nut cover 42 may be heated for expansion so that the base portion 52 will slide over the lip 36 of the body and into the recess 44. If the body 12 and the nut cover 42 are formed in one piece, the hexagonal-shaped nut cover 42 would prevent rotation of the body 12 with respect to the threads 14. As previously explained, however, rotation of the body 12 may not be necessary in order to sealingly engage the O-ring 38 against the nut 6.

If the body 12 and the nut cover 42 are to be formed in one piece, the nut cover 42 may alternatively be formed so that the smallest inner diameter within the nut cover 42 is equal to or greater than the largest cross-sectional dimension of the nut 6. For instance, the sidewalls of the nut cover 42 may be cylindrical in configuration, and the diameter of the nut cover may be slightly greater than the largest diameter of the nut 6. In the latter embodiment, if a lip is not provided for continuous engagement with the sidewalls of the nut 6, then the unitary body 12 and nut cover 42 could be rotated after being placed over the threads and nut, respectively.

The nut cover 42 physically encloses most of the exposed surface of the nut 6. Thus, the nut cover 42 functions as a painting shield to prevent build-up on the surface of the nut 6, and also serves to provide some corrosion protection to the nut 6. The lip 46 may not sealingly engage the sides of the nut 6, and therefore some corrosion of the surfaces of the nut 6 may occur. Corrosion of the nut, however, will be reduced, and removal of the nut will not be hampered by corrosion or paint buildup on the outer surfaces of the nut.

Referring again to FIGS. 1 and 2, it may be seen that the recesses 30 for containing the ends of the leaf spring 26 need only be as long as the width of the leaf spring. Alternatively, an annular recess may be provided around the interior of the wall 22. The leaf spring 26 may be fabricated from metal, and the stopper 32 may be formed from plastic, rubber, or other pliable material. The bladder 24 may also be fabricated from rubber, and may be glued against the interior of the wall 22.

The length that the bolt 4 protrudes beyond the nut 6 will depend, of course, on the number of exposed threads. The membrane 24 is recessed into the wall 22, so that the bolt 4 may, if necessary, extend within the body 12 to the leaf spring 26. Alternatively, the interior portion 48 may be provided adjacent the lip of the cup-shaped body for engagement with the threads 14. The interior portion 48 may extend circumferentially around the threads 14. Alternatively, as shown in FIG. 2, two shoulder portions 48 and 49 may be provided for engagement with the threads 14, each shoulder portion occupying a radial space of approximately 90° or less. A U-shaped boot may be used instead of the O-ring 38 for sealing the lip of the body 12 against the nut 6. If desired, either the O-ring 38 or the U-shaped boot may be glued to the lip 36 of the body 12.

Figure 3:
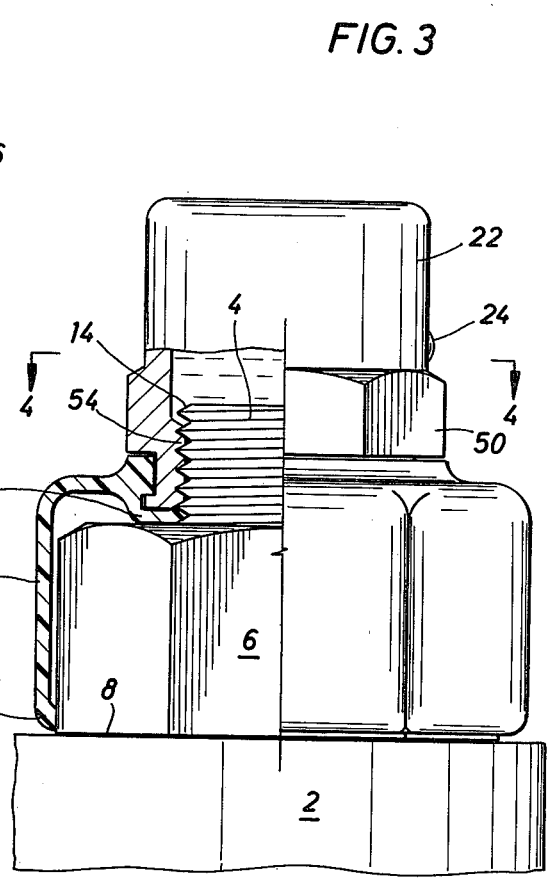
FIG. 3 is a pictorial representational, partially in cross-section, of another embodiment of the apparatus depicted in FIG. 1.

Referring now to FIG. 3, another embodiment of the present invention is depicted, partially in cross-section. In FIG. 3, the same numerals are used to denote components similar to those shown in FIGS. 1 and 2. The body 12 is provided with a threaded shoulder portion 54 for engagement with the threads 14. The internal threads on the shoulder portion 54 are designed for threading engagement with the external threads 14 of the protruding bolt 4. Thus, the thread protector in FIG. 3 may be threaded onto the bolt, rather than being axially pressed over the threads.

The nut cover 56 shown in FIG. 3 contains an annular lip 58 to effectuate a seal between the body and the nut 6. The lip 58 of the nut cover 56 therefore replaces the O-ring 38 shown in FIG. 1.

Operation of the embodiment shown in FIG. 3 is much like the embodiment previously described, except that the body is threaded to the exposed bolt or stud 4. The lip 58 is compressed to form a seal between the body and the nut, and also seals the threads 14 so that fluid cannot pass through the threads to the interior of the nut 6.

The nut cover 56 is slidably fitted to the body, so that the nut cover 56 does not rotate when the body is threaded to the exposed bolt 4. The configuration of the nut cover 56 may be hexagonal, as shown by the nut cover depicted by FIG. 2, wherein the lip 46 of the nut cover 56 is in engagement with the six sides of the nut 6.

The embodiment in FIG. 3 may contain the leaf spring and stopper shown in FIG. 1. Alternatively, some other valve means may be provided which normally seals the interior of the body from the atmospheric conditions, but may be actuated to intermittently allow a pressurized fluid mixture to enter the interior of the body. FIG. 3 is also shown to contain a side view of the membrane 24, which is protruding beyond the sidewall 22, indicating that a desired pressure level exists within the interior of the body.

Figure 4:
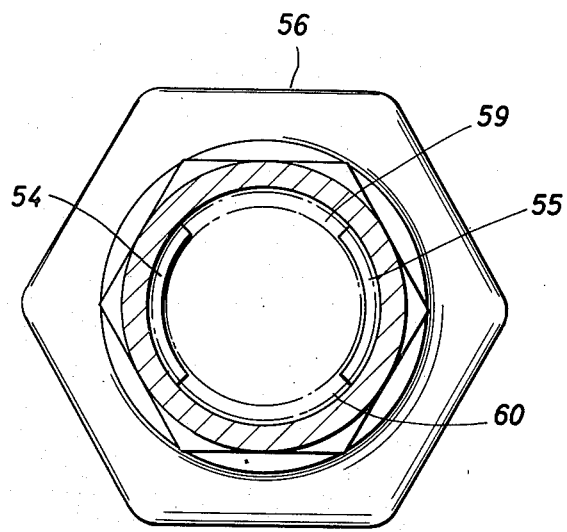
FIG. 4 is a cross-sectional view of the apparatus depicted in FIG. 3.

FIG. 4 is a cross-sectional view of the apparatus depicted in FIG. 3. As shown in FIG. 4 two threaded shoulder portions 54 and 55 are provided for engagement with the threads 14. Each of the shoulder portions is within a cross-sectional radial segment of less than 90°, so that the body may be molded and removed from a die or mold by a one-quarter turn. Also, a complete annular shoulder portion 54 may not allow lubricant within the body to come into contact with the threads near the nut 6. Threaded portions 54 and 55 adequately retain the thread protector and nut cover in place, and allow fluid within the body to occupy the voids 59 and 60, so that fluid comes into contact with the threads near the nut 6.

Figure 6:
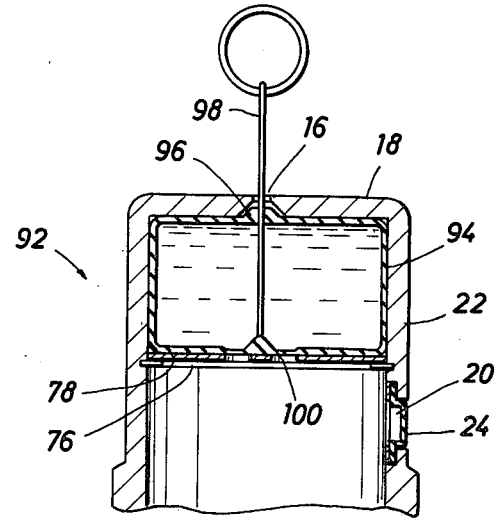
FIGS. 5, 6 and 7 are cross-sectional representations of further embodiments of a portion of the apparatus depicted in FIG. 1 and FIG. 3.
Figure 5:
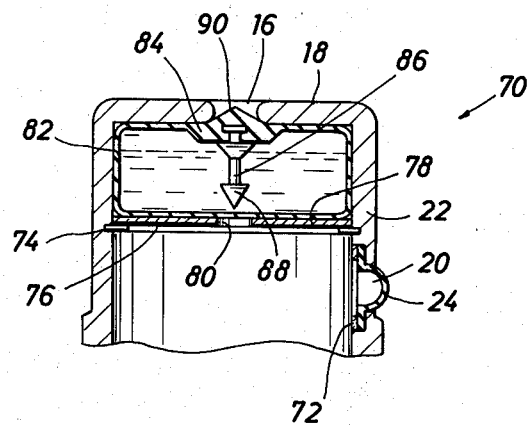
Figure 7:
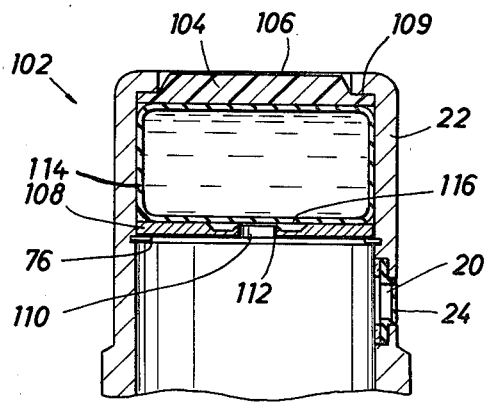

FIGS. 5, 6, and 7 are cross-sectional representations of alternate embodiments of the present invention, and depict various mechanisms for filling the interior of the body with a pressurized fluid after the body has been placed onto the stud 4. Each of the embodiments shown in FIGS. 5, 6, and 7 may be used with the lower body portions and nut protectors shown in either FIGS. 1 or 3. Again, the same numerals will be used to denote components similar to those depicted in FIG. 1.

In FIG. 5, a thread protector 70 is shown having a base 18 and sidewalls 22. A membrane 24 is placed over an aperture 20 in the sidewall 22. A metallic washer 72 is positioned over the base of the membrane 24, and assists in maintaining the periphery of the membrane 24 in position over the aperture 20. The washer 72 and membrane 24 may be glued in position to the sidewall 22, or may be staked, clamped, press fitted, or otherwise held by conventional means.

An annular groove 74 in the interior of the sidewall 22 accommodates a C-shaped snap ring 76. Positioned over the snap ring 76 is a flat screen 78 having one or more apertures 80.

A charged pressure vessel 82 is positioned between the base 18 and the screen 78. A mixture of liquid and gas, such as a lubricating oil and nitrogen gas mixture, is contained in the vessel 82 under pressure. The walls of the pressure vessel 82 may be fabricated from nylon, rubber, or other suitable material. A reinforced section 84 adjacent the aperture 16 may be fabricated from a similar material. Molded in the reinforced section 84 is a puncture member 86, with a pointed tip 88 adjacent one of the walls of the pressure vessel 82.

A pressure vessel 82 may be pre-charged to a predetermined pressure level, e.g., 5 to 7 PSIG. The thread protector 70, with the pre-charged pressure vessel 82 held in place by the snap ring 76 and the screen 78, may thereafter be shipped to the user. The thread protector 70 and an accompanying nut protector may be installed over the threads and nut, respectively, by one of the techniques previously described. With the thread protector 70 in place, a user may exert force against the reinforced section 84 with his finger, a screwdriver, or other tool. As the reinforced section 84 is pushed toward into the interior of the thread protector 70, the pointed tip 88 pierces the wall of the pressure vessel 82, thereby discharging fluid into the interior of the thread protector 70.

As previously described, the interior of the thread protector 70 is sealed from the external environment, and the gaseous component of the mixture inside the pressure vessel 82 causes the mixture to expand to fill the entire interior of the pressure vessel 70, which will, in turn, cause the membrane 24 to protrude beyond the wall 22. After the sidewall of the pressure vessel 82 has been punctured, it may be possible for fluid to migrate between the interior of the wall 22 and the sides of the pressure vessel 82. If desired, a stopper portion 90 may be formed adjacent the reinforced section 84, to insure that the fluid mixture will not escape through the aperture 16.

An operator may periodically check the membrane 24 of the device illustrated in FIG. 5, to insure that the interior of the thread protector 70 is under fluid pressure of a preselected range. If the pressure vessel 82 has been pre-charged to a pressure level of from 5 to 7 PSIG, the pressure within the interior of the thread protector 70 after the pressure vessel has been ruptured may be in the range of from 1 to 3 PSIG, depending on the volume of the pressure vessel 82 with respect to the interior of the thread protector 70. If an operator detects that the pressure has dropped within the interior of the thread protector 70, the thread protector 70 may be removed from the bolt 4, and a new pressure vessel inserted and held in place by the screen 78 and snap ring 76. After the thread protector 70 has been reinstalled on the bolt, a new pressure vessel may be ruptured in the manner described above.

Referring now to FIG. 6, there is indicated another embodiment of the present invention. The thread protector 92 is shown having a base 18, walls 22 and a membrane 24 placed over the aperture 20. In FIG. 6, the membrane 24 is shown in its deflated position when subjected to only atmospheric pressure.

A pressure vessel 94 is positioned between the base 18 and the washer 78 held in place by the snap ring 76. A stopper 96 may be molded in or positioned over a portion of the pressure vessel 94 adjacent the aperture 16.

Pull string 98 sealingly passes through the stopper 96, and is attached at one end to a tear-away portion 100 of the pressure vessel 94. The tear-away portion 100 may be fabricated from a different material than the remainder of the pressure vessel 94, or may be fabricated from the same material but have a thinner wall construction than the other portions of the pressure vessel. Although the string 98 passes through the stopper 96, the stopper 96 is pliable so that when the string 98 is pulled, the stopper 96 yields but does not tear away from the string 98. After the thread protector 92 has been placed over the bolt 4, an operator may pull string 98 in a direction opposite the lip of the thread protector. Pulling the string 98 may slightly displace the stopper 96 from its normal position, but the string 98 will not tear free from the stopper 96. The pulling action on the string causes a rip in the tear-away portion 100, so that fluid within the pressure vessel 94 disperses throughout the interior of the thread protector 92. The thread protector 94 may be visually checked to ascertain that a positive pressure remains within the interior of the pressure vessel, as previously described. Also, the pressure vessel 94 may be replaced in a manner similar to replacement of the pressure vessel 82.

In FIG. 7, there is depicted a thread protector 102 having sidewalls 22 and membrane 24 placed over aperture 20. A flexible seal 104 is placed over a large-diameter aperture 106 in the base of the thread protector. The periphery portion 109 of the seal 104 may be sealed in a conventional manner, e.g., gluing, to the interior of the base of the thread protector. A washer 108 is held in place by a C-shaped ring 76, and has one or more apertures 110 therein, and may have one or more barbs 112 pointing in the direction of the seal 104. A pressure vessel 114 is located between the washer 108 and the seal 104, and contains a desired liquid/gas mixture at a preselected pressure.

Once the thread protector 102 has been placed over the bolt 104, an operator may use his finger or tool to press inwardly against the seal 104. Since the fluid mixture in the pressure vessel 114 may be at a pressure of approximately 5 to 7 PSIG, it may be seen that pressing against the seal 104 will cause the lower portion 116 of the pressure vessel to move in the direction of barbs 112. By this action, the pressure vessel 114 is ruptured, and the fluid mixture is dispersed throughout the interior of the pressure vessel 102. Since a seal is provided between the member 104 and the base of the thread protector, no fluid is allowed to leak through the aperture 106 after the pressure vessel 114 has been ruptured.

As previously described, an operator may detect the presence of a positive pressure in the interior of the thread protector 102 in the same manner as with the other embodiments of this invention.

A further embodiment of this invention is similar to the embodiment depicted in FIG. 7, except that the C-ring 76, the washer 108, and the pressure vessel 114 are not supplied. In this latter embodiment, the thread protector is inserted over the nut, and the periphery portion 109 is sealed against the interior of the base of the thread protector. After the thread protector is in place, a sharp pointed member, such as hypodermic needle, is used to puncture the seal member 104 and inject a mixture of fluid or fluid and gas into the interior of the thread protector. When the bladder 24 indicates that the interior of the thread protector has been sufficiently pressurized, the hypodermic needle may be withdrawn, and the material of the seal 104 is sufficiently pliable that no fluid leaks through the place where the hypodermic needle was inserted. This latter embodiment has the advantage of being rechargeable should the pressure in the interior of the thread protector drop below an acceptable value. Also, the diameter of the seal 104 need not be as large as that depicted in FIG. 7, and need only be large enough to insure adequate room for insertion of a pointed object for pressurizing the interior of the thread protector.

Any of the above means for pressurizing the interior of the thread protector may be utilized with the lower portions of the thread protector and the nut cover shown in either FIG. 1 or FIG. 3. Also, any suitable fluid may be utilized to pressurize the interior of the thread protector, and a petroleum-base lubricant and a nitrogen gas propellant mixture is illustrative. It is a feature of the present invention, however, to utilize a mixture containing an inert gas for the purpose of propelling the liquid into the interior of the thread protector. Also, the inert gas will not tend to damage or otherwise corrode the exposed threads of the stud or bolt.

The bladder as well as the pressure vessel may be fabricated from a soft pliable material such as rubber. The thickness and the flexibility of the bladder may be altered in order to accomplish the desired purpose of a visual indication that the desired pressure level has been attained within the interior of the thread protector. The body of the thread protector may be fabricated from any number of suitable plastics, including polyurethane. The nut cover may also be fabricated from polyurethane, but need not be as hard as the body of the thread protector. The nut cover illustrated in FIG. 3, for instance, may be sufficiently pliable that the lip 58 adequately serves as a seal to replace the O-ring.

Although the invention is principally applicable for protecting the threads of a bolt and for protecting a nut in an assembly, the thread protector may be utilized for protecting exposed threads of any threaded object. For instance, the thread protector described herein may be utilized for protecting exposed threads of a rod threaded within an assembly, and not employing a nut threaded to the rod. Also, any number of valve means may be utilized for allowing entry of a fluid into the thread protector body, such as a spring biased valve, although the valve described herein has several important features.

Many other alternative forms of the present invention will be apparent from the foregoing methods and apparatus. Accordingly, the structures and techniques hereinbefore depicted and discussed are illustrative only, and are not intended as limitations on the scope of the present invention.

What is claimed is:

1. Apparatus for protecting threads from the environment, comprising:
    a body member having a circular opening at one end thereof approximating the diameter of said threads and a cavity for receiving said threads,
    retaining means on said body member for fixedly positioning said body member over said threads,
    sealing means adjoining said opening for sealing said cavity from the environment, and
    valve means carried by said body member for introducing a selected fluid under pressure into said cavity and into fluid engagement with said threads.

2. The apparatus recited in claim 1, further comprising:
    a flexible bladder member secured to said body member for maintaining pressure within said cavity within a preselected pressure range.

3. The apparatus recited in claim 1, wherein said retaining means includes internal threads on said body for threaded engagement with said threads.

4. The apparatus recited in claim 2, wherein said valve means comprises:
    a leaf spring positioned within said cavity, and
    a stopper positioned on said leaf spring for sealing engagement with an aperture within said body member.

5. The apparatus recited in claim 1 wherein said threads protrude outwardly from a nut threaded onto said threads, said apparatus further comprising:
    a hexagonal-shaped nut cover slidably mounted on said body for covering a substantial portion of said nut.

6. The apparatus of claim 5, wherein said body is cup-shaped, and said sealing means comprises an annular O-ring located adjacent the lip of said cup-shaped body.

7. Apparatus recited in claim 1, wherein said valve means comprises:
    a stopper for sealing engagement with an aperture within said body member, and
    spring means for biasing said stopper toward said aperture.

8. The apparatus as recited in claim 2, wherein said flexible bladder member covers an aperture within said body member and expands to provide an indication of fluid pressure within said cavity.

9. The apparatus as recited in claim 1, wherein said sealing means is in engagement with a portion of said threads for sealing said cavity from the environment.

10. The apparatus as recited in claim 5, wherein said sealing means is in engagement with said nut for sealing said cavity from the environment.

11. Apparatus for protecting threads from the environment, comprising:
    enclosure means having an opening at the end thereof and a cavity for receiving said threads,
    sealing means adjacent said opening for sealing said cavity from the environment when said enclosure means is positioned over said threads,
    a pressure vessel within said cavity for containing a pressurized fluid including a selected gas, and
    actuation means for rupturing said pressure vessel while enclosure means has been positioned over said threads and said cavity has been sealed from the environment.

12. The apparatus of claim 11, further comprising
    a flexible bladder responsive to pressure within said cavity for providing an indication of fluid pressure within said cavity, and
    a nut cover mounted on said enclosure means for covering a substantial portion of a nut threaded onto said threads.

13. The apparatus of claim 11, wherein said activation means for rupturing said pressure vessel includes a pointed member for selective engagement with said pressure vessel.

14. The apparatus as recited in claim 12, wherein said flexible bladder covers an aperture within said enclosure means for maintaining pressure within the cavity within a preselected pressure range.

15. A method for protecting threads of a bolt from the environment, comprising
    sealing said threads from the environment with an enclosure,
    thereafter injecting a selected fluid through said enclosure and into contact with said threads,
    retaining said selected fluid under pressure within said enclosure for inhibiting corrosion.

16. The method of claim 15, further comprising
    detecting the level of fluid pressure within said enclosure.

17. The method as recited in claim 15, further comprising:
    providing an expandable member secured to said enclosure for maintaining said selected fluid within a preselected pressure range within said enclosure.

18. A method for protecting threads from the environment, comprising:
    providing a pressurized vessel containing a selected fluid within an enclosure,
    sealing said threads from the environment with said enclosure,
    thereafter rupturing said pressurized vessel within said enclosure for releasing said selected fluid into contact with said threads,
    retaining said selected fluid under pressure within said enclosure for inhibiting corrosion.

19. The method of claim 18, further comprising:
    maintaining said selected fluid within a preselected pressure range within said enclosure.

* * * * *